US009153184B2

(12) United States Patent
Jun et al.

(10) Patent No.: US 9,153,184 B2
(45) Date of Patent: Oct. 6, 2015

(54) METHOD OF PROCESSING DATA AND DISPLAY APPARATUS FOR PERFORMING THE METHOD

(75) Inventors: Bong-Ju Jun, Cheonan-si (KR); Jae-Hyoung Park, Asan-si (KR); Ik-Huyn Ahn, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 1378 days.

(21) Appl. No.: 12/873,799

(22) Filed: Sep. 1, 2010

(65) Prior Publication Data

US 2011/0169800 A1 Jul. 14, 2011

(30) Foreign Application Priority Data

Jan. 8, 2010 (KR) ........................ 10-2010-0001498

(51) Int. Cl.
*G06F 3/038* (2013.01)
*G09G 3/36* (2006.01)

(52) U.S. Cl.
CPC ............ *G09G 3/3644* (2013.01); *G09G 3/3666* (2013.01); *G09G 2320/0233* (2013.01); *G09G 2320/0242* (2013.01); *G09G 2320/0247* (2013.01); *G09G 2320/0252* (2013.01); *G09G 2340/16* (2013.01); *G09G 2370/14* (2013.01)

(58) Field of Classification Search
USPC ........... 345/204, 100, 99, 89, 694, 76, 90, 93, 345/96, 208, 58
See application file for complete search history.

(56) References Cited

U.S. PATENT DOCUMENTS 5,881,128 A * 3/1999 Lee .............................. 379/1.01
5,974,464 A * 10/1999 Shin et al. ...................... 709/231
6,320,567 B1 * 11/2001 Hirakata et al. .............. 345/100
7,843,400 B2 * 11/2010 Nakai et al. .................... 345/1.3
2003/0020683 A1 * 1/2003 Waterman ........................ 345/98
2004/0196274 A1 * 10/2004 Song et al. .................... 345/204
2007/0052643 A1 3/2007 Li et al.
2007/0052654 A1 * 3/2007 Yokota et al. ................... 345/98
2007/0054654 A1 * 3/2007 Jones ............................ 455/406
2008/0001888 A1 * 1/2008 Lee ................................ 345/96
2008/0174591 A1 * 7/2008 Park et al. ..................... 345/212

(Continued)

FOREIGN PATENT DOCUMENTS

JP 11-133931 5/1999
JP 2002-175039 6/2002
JP 2006-184448 7/2006
JP 2008-181081 8/2008

(Continued)

*Primary Examiner* — Dwayne Bost
*Assistant Examiner* — Robert Michaud
(74) *Attorney, Agent, or Firm* — H.C. Park & Associates, PLC

(57) ABSTRACT

A display apparatus includes a display panel, a timing control part and a data driving part. The display panel is divided into N display areas. The timing control part includes a serializing part to serializing N data received in parallel to generate an N-th frame data, a overdriving part to select one of the N-th frame data and a previous frame data stored depending on whether the received data are normal and to compensate the selected frame data to generate a compensation frame data, and an interface part to divide the compensation frame data and to output the N compensation data. A data driving part includes N data driving circuits to generate data driving voltages corresponding to the N compensation data to output the data driving voltage to the N display areas where N is a natural number.

28 Claims, 7 Drawing Sheets

(56) References Cited

U.S. PATENT DOCUMENTS

| | | | | |
|---|---|---|---|---|
| 2008/0284704 | A1* | 11/2008 | Song et al. | 345/94 |
| 2010/0177107 | A1* | 7/2010 | Park et al. | 345/545 |
| 2011/0175865 | A1* | 7/2011 | Bae et al. | 345/204 |
| 2011/0234625 | A1* | 9/2011 | Irie et al. | 345/601 |
| 2012/0053882 | A1* | 3/2012 | Taura | 702/117 |
| 2012/0200542 | A1* | 8/2012 | Hong et al. | 345/204 |

FOREIGN PATENT DOCUMENTS

| | | |
|---|---|---|
| KR | 10-2006-0012194 | 2/2006 |
| KR | 10-2006-0079030 | 7/2006 |
| KR | 10-2008-0012522 | 2/2008 |
| KR | 10-2008-0068486 | 7/2008 |
| KR | 10-2009-0036650 | 4/2009 |
| KR | 10-2009-0059502 | 6/2009 |

* cited by examiner

200

400

METHOD OF PROCESSING DATA AND DISPLAY APPARATUS FOR PERFORMING THE METHOD

CROSS-REFERENCE TO RELATED APPLICATION

This application claims priority to and the benefit of Korean Patent Application No. 10-2010-0001498, filed on Jan. 8, 2010, which is incorporated by reference for all purposes as if fully set forth herein.

BACKGROUND OF THE INVENTION

1. Field of the Invention

Exemplary embodiments of the present invention relate to a method and an apparatus for processing data, more particularly, to a display apparatus capable of displaying a uniform display image and a method of manufacturing a display apparatus for performing a uniform display.

2. Description of the Background

Generally, a liquid crystal display (LCD) apparatus has been adopted as one of the most widely used display apparatus due to a thin thickness, a light weight and low power consumption such as a monitor, a laptop, a mobile phone. The LCD apparatus typically includes an LCD panel displaying an image utilizing a variation in light transmittance of liquid crystals by controlling a voltage applied by a driving part electrically connected to the LCD panel and controlling the LCD panel.

These advantages have spawned significant adoption by consumers and manufacturers of LCD apparatuses have fueled this acceptance by developing a full high definition (FHD) resolution LCD panel, for example, the resolution of which is 1920×1080.

Consequently, manufacturing of an LCD apparatus has been challenged to improve a resolution, for example, a frame rate of a signal having a frequency of about 60 Hz should be converted to the frame rate having a high frequency such as 120 Hz, 240 Hz and 480 Hz by controlling the frame rate. For instance, an approach with a multi-chip structure using two or more frame rate controller converting a frame rate of an input image has been used to drive a high-speed frame. However, the goal of the high resolution is at odds with the multi-chip structure in that a deviation among the chips occurs—a skew among signals inputted to the driving part may occur although the structures of the chips are substantially the same with one another. Thus, unwanted images are displayed on the LCD panel attributed to the skew.

One approach has been introduced to clear the skew problem occurring by determining the signals as an abnormal input which is considered out of a preset range, then a preset specific pattern is displayed so that the abnormal image may be prevented from being displayed. Unfortunately, a screen flicker occurs while the preset specific pattern is displayed is when the abnormal image is inputted. Thus, the image may be flickered, and the screen flicker may cause inconvenience to a viewer. Therefore, there is a need for an approach to enhance resolution without occurring skew and flickering problems.

SUMMARY OF THE INVENTION

Exemplary embodiments of the present invention provide a method of processing data for displaying a previous image when an abnormal image is inputted.

Additional features of the invention will be set forth in the description which follows, and in part will be apparent from the description, or may be learned by practice of the invention.

Exemplary embodiments of the present invention disclose a method for processing data. The method includes serializing data received in parallel to generate an N-th frame data. The method also includes selecting the N-th frame data or a previous frame data depending on whether the received data is detected as normal. The method includes compensating the selected frame data to generate a compensation frame data. The method further includes dividing the compensation frame data into N compensation data, wherein N is a natural number.

Exemplary embodiments of the present invention disclose a display. The display includes a control part to convert data received in parallel structure into a serialization structure to generate an N-th frame data. The display also includes an overdriving part to select the N-th frame data or a previous frame data. The selection is based on whether the received data are determined as normal, wherein the selected frame data is compensated by a compensation frame data. The display further includes an interface part to divide the compensated frame data into N is compensation data and to output the N compensation data. The display includes a data driving part to generate a data driving voltage corresponding to the N compensated data to output the data driving voltage to the respective N display areas, wherein N is a natural number.

Exemplary embodiments of the present invention disclose an apparatus. The apparatus includes a processor configured to convert data received in a parallel format into a serialization format to detect the received in a sequence order. The processor determines to select the received data or previous data created and stored previously than to the received data, the determination is based on whether the received data is processed as a normal data based on threshold reference value. The apparatus also includes a memory configured to store the previous data corresponding to N sectors each sectors corresponding to the respective displaying portions of a display panel. The apparatus includes a control part configured to generate a compensation data to compensate the selected data, and the compensated data frame is divided into N to output the compensated data to the respective N sectors display panel, wherein the N is a natural number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
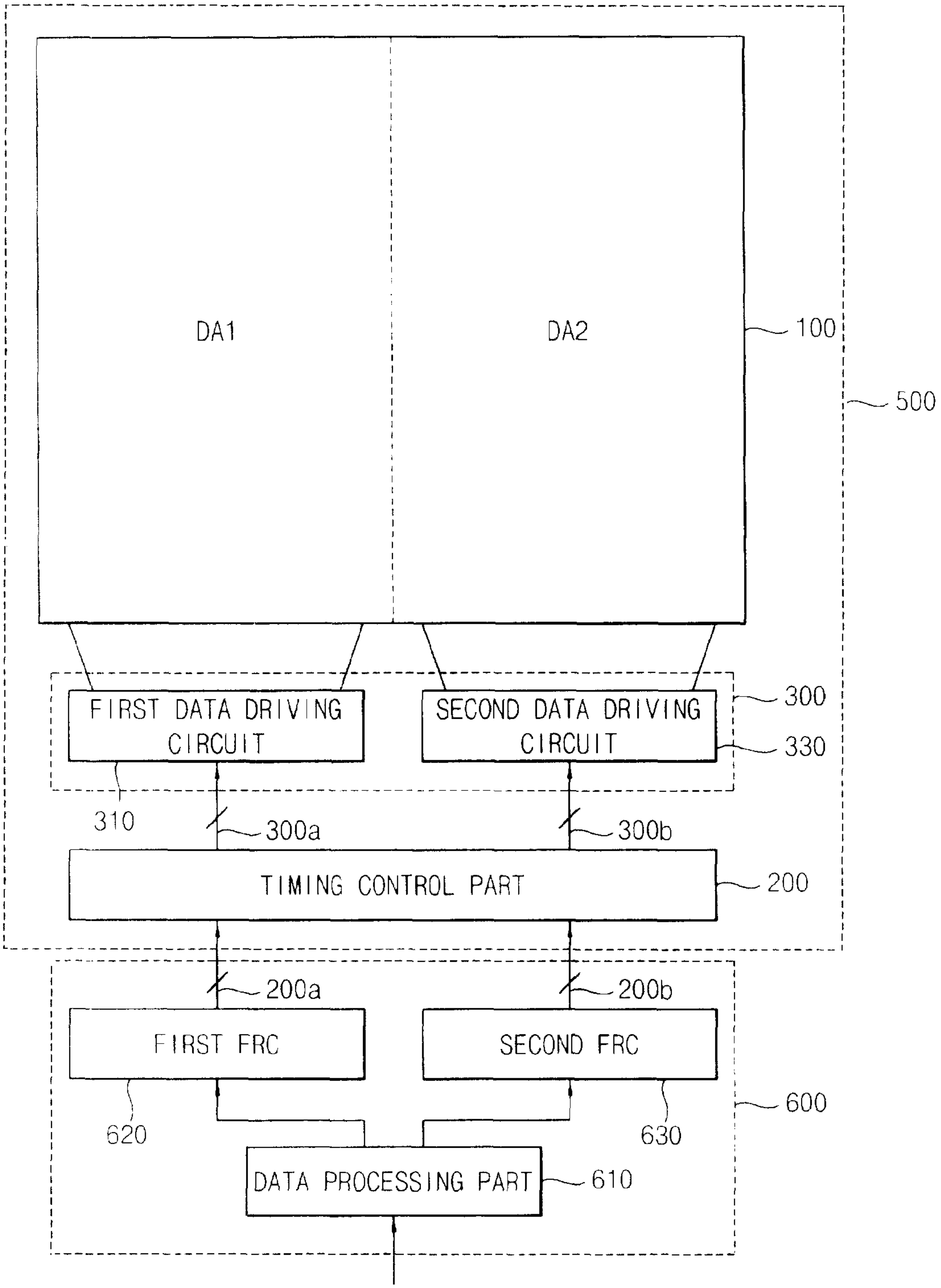
FIG. 1 is a diagram of a display apparatus capable of processing data according to exemplary embodiments of the present invention.

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure will be thorough and complete, and will fully convey the scope of the present invention to those skilled in the art. In the drawings, the sizes and relative sizes of layers and regions may be is exaggerated for clarity. Like reference numerals in the drawings denote like elements.

It is understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any part, combinations of two or more parts, or combinations of all parts of the associated listed items.

It is observed that although the terms using a numerical term such as a first, a second, a third they may be used herein to describe various elements, components, regions, layers and/or sections, these elements, components, regions, layers and/or sections should not be limited by these numerical terms. These terms are merely used to distinguish one element, component, region, layer or section from another region, layer or section. Thus, an element, a component, a region, a layer or a section designated as "first" could be interpreted as an element, a component, a region, a layer or a section designated as a "second," without departing from the teachings of the present invention.

It is also noted that terms related to spatially relative terms, such as "beneath," "below," "lower," "above," "upper,"—these terms may be used herein to describe one element or feature's relationship to another element(s) or feature(s) as illustrated in the figures. It is understood that the spatially relative terms are intended to show different orientations of the apparatus based on an operation standard element or a feature depicted in the figures. For example, if the apparatus seen in the figures is turned over, elements described as "below" or is "beneath" other elements or features would then be oriented "above" or "on" with respect to the other elements or features. Thus, the term using "below" can be interpreted to encompass both an orientation of above and below. The elements of the apparatus may be otherwise oriented (e.g., rotated 90 degrees or at a certain orientations) and the spatially relative descriptors used herein can be interpreted accordingly.

The terminology used herein is for the purpose of describing exemplary embodiments and is not intended to be limiting of the present invention. As used herein, the singular forms "a," "an" and "the" are intended to include the plural forms as well, unless the context clearly indicates otherwise. It is also understood that the terms "comprises" and/or "comprising," when used in this specification intended for specifying the presence of stated features, integers, steps, operations, elements, and/or components, but not precluding the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, various exemplary embodiments are illustrated by way of examples, and not by way of limitation, thus, variations from the shapes of the illustrations as a result, for example, of manufacturing techniques and/or tolerances, are to be expected. Thus, illustrated examples and embodiments of the present invention should not be construed as limited to the particular shapes of regions illustrated herein but are to be construed including deviations of shapes that result, for example, from manufacturing techniques and options. For example, an implanted region illustrated as a rectangle will, typically, have rounded or curved features and/or a gradient of implant concentration at its edges rather than a binary is change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meanings in the context of the relevant art and will not be interpreted in an idealized or overly formal sense unless expressly so defined herein.

Hereinafter, the present invention will be explained in detail with reference to the accompanying drawings.

FIG. 1 is a diagram of a display apparatus capable of processing data according to exemplary embodiments of the present invention.

Referring to FIG. 1, a display apparatus may include a display panel 100, a timing control part 200 and a data driving part 300.

The display panel 100 may have a resolution of $(n\times i)\times(n\times j)$. In this example, n may be a number equal to or more than 1, i may be referred to as 1024 and j may be referred to as 1080, as an example. For example, the display panel 100 may have at least a resolution of FHD. The display panel 100 may be divided into N display areas. In some examples, the display panel 100 can be divided into two display areas 'DA1' and 'DA2.' When the display panel 100 has the resolution of equivalent to the FHD, a first display area 'DA1' and a second is display area 'DA2' can be considered having a resolution of 960×1080, respectively.

For example, the display panel 100 may include two substrates and a liquid crystal layer disposed between the two substrates. The display panel 100 may include a plurality of pixels for displaying an image. Each of the pixels may include a switching element coupled to a data line and a gate line crossing with each other, and a liquid crystal capacitor is coupled to the switching element. Each of the pixels may further include a storage capacitor coupled to the switching element.

Figure 2:
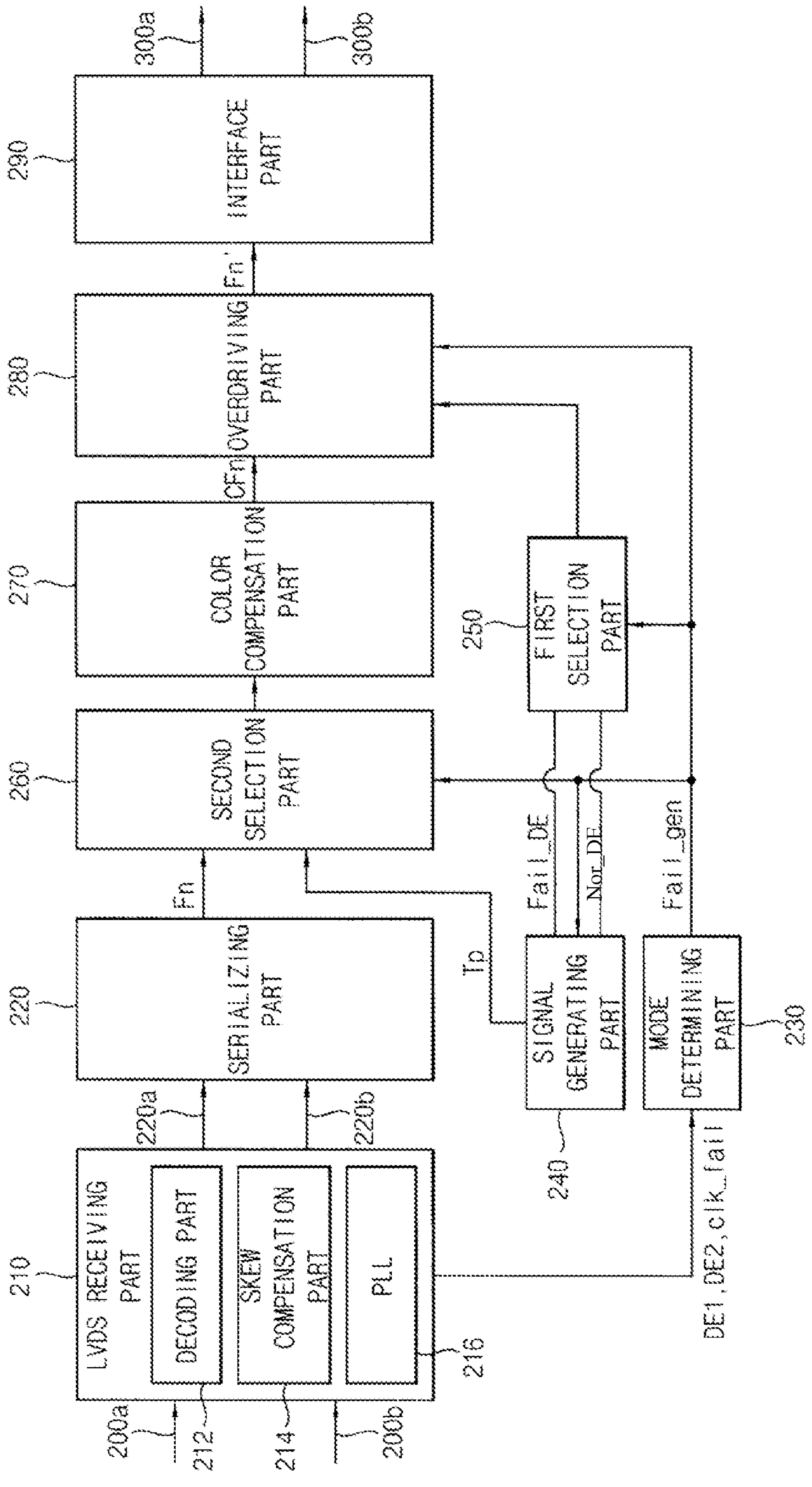
FIG. 2 is a diagram capable of supporting a timing control of the display apparatus of FIG. 1.

By way of example, the timing control part 200 can be provided to convert N data received in parallel structure into serialization structure during an N-th frame, wherein N can be a natural number, from an external video system 600 to generate an N-th frame data. This conversion can be referred to as "serialization." The timing control part 200 can be provided to select one of the N-th frame data and a previous frame data stored in advance in a frame memory (not shown) depending on whether the received N data are determined as normal. The timing control part 200 can be provided to compensate the selected frame data and to generate a compensated frame data. The timing control part 200 can divide the compensation frame data into N compensation data and can output the N compensation data to the data driving part 300 in parallel. For the purpose of explanation, the present invention is described with a detailed explanation for the timing control part 200 as shown in FIG. 2.

In some examples, the video system 600 can receive a frame image transmitted from an external apparatus using a low voltage differential signaling (LVDS) method and can transmit the frame image to the timing control part 200.

The video system 600 may include a data processing part 610, a first frame rate control part 620 and a second frame rate control part 630.

The data processing part 610 can convert a resolution of the frame image received from the external apparatus to a resolution of the display panel 100. The data processing part 610 can separate the frame image into a first image signal corresponding to the first display area 'DA1' and a second image signal corresponding to the second display area 'DA2' and can output the first image signal and the second image signal to the first frame rate control part 620 and second frame rate control part 630, respectively.

Each of the first frame rate control part 620 and second frame rate control part 630 can convert a frame frequency of the first image signal and the second image signal received from the data processing part 610 to a frame frequency of the display panel 100. For example, the first frame rate control part 620 and the second frame rate control part 630 may convert a frame rate of a half frame image having a frequency of about 60 Hz to the frame rate having a frequency of about 240 Hz. Driving frequencies of the first frame rate control part 620 and the second frame rate control part 630 may be about 240 Hz.

The data driving part 300 may include a first data driving circuit 310 and a second data driving circuit 330.

The first data driving circuit 310 can generate a first data driving voltage corresponding to a first compensation data 300*a* and can provide the first data driving voltage to the first display area 'DA1.' The first compensation data 300*a* corresponding to the first display area 'DA1' can be received from the timing control part 200. For example, the first compensation data 300*a* may include 960×1080 image data. The first data driving circuit 310 may output the first compensation data 300*a* with a frame frequency of about 240 Hz.

The second data driving circuit 330 can generate a second source driving voltage corresponding to a second compensation data 300*b* and can provide the second source driving is voltage to the second display area 'DA2.' The second compensation data 300*b* corresponding to the second display area 'DA2' can be received from the timing control part 200. The second compensation data 300*b* may include 960×1080 image data. The second data driving circuit 330 may output the second compensation data 300*b* with a frame frequency of about 240 Hz. Therefore, this approach can achieve that the display panel 100 can display the frame image having a resolution of 1920×1080 with a frame frequency of about 240 Hz.

FIG. 2 is a block diagram illustrating a timing control part of FIG. 1.

Referring to FIG. 1 and FIG. 2, the timing control part 200, for example, may include an LVDS receiving part 210, a serializing part 220, a mode determining part 230, a signal generating part 240, a first selection part 250, a second selection part 260, a color compensation part 270, an overdriving part 280 and an interface part 290.

For example, the LVDS receiving part 210 can receive first image signal 200*a* and second image signal 200*b* from the first frame rate control part 620 and the second frame rate control part 630. In this example, the frame rates of the first image signal 200*a* and the second image signal 200*b* can be changed.

The LVDS receiving part 210 may include a decoding part 212, a skew compensation part 214 and a phase locked loop (PLL) 216.

The decoding part 212 can decode the first image signal 200*a* and the second image signal 200*b* and can output a clock signal, a first data 220*a*, a first data enable signal 'DE1,' a second data 220*b* and a second data enable signal 'DE2.' In some examples, the first data 220*a* and the first data enable signal 'DE1' can correspond to the first display area 'DA1' and the second data 220*b* and the second data enable signal 'DE2' can correspond to the second display area 'DA2.'

The skew compensation part 214 may compensate a skew occurring between the first and second data 220*a* and 220*b* based on the first data enable signals 'DE1' and second data enable signal 'DE2.' The skew compensation part 214 can include a line buffer memory (not shown) to compensate the skew. For example, the skew compensation part 214 may include an 8-line buffer memory to compensate the skew.

The PLL 216 can receive the clock signal. The PLL 216 is configured to maintain phases of an input clock signal and an output clock signal. The PLL 216 can generate a clock determining signal 'clk_fail' and can transmit the signal 'clk_fail' to the mode determining part 230 in response to detection of the signal clk_fail in relation to phase of a reference signal. The PLL 216 can output the clock in response to determining signal 'clk_fail' of a high level, when the clock signal is detected as abnormal. The PLL 216 can output the clock determining signal 'clk_fail' of a low level, when the clock signal is detected as normal. For example, when a number of the clock signals can be determined as out of a preset range (e.g., a threshold range), the PLL may determine the clock signal as an abnormal clock signal.

The serializing part 220 can be provided to perform serialization by converting data structure of the first data 220*a* and second data 220*b* received from the LVDS receiving part 210 to generate the N-th frame data Fn. In some examples, the N-th frame data 'Fn' can be transmitted to the second selection part 260.

The mode determining part 230 may determine whether the first data 220*a* and the second data 220*b* can be determined as normal based on a detection of the first data enabling signal 'DE1' and second data enable signal 'DE2' and the clock determining signal 'clk_fail.'

For example, the mode determining part 230 can determine the first data 220*a* and the second data 220*b* as normal data in response to detection of low level of the clock is determining signal 'clk_fail' received from the PLL 216. The mode determining part 230 can determine the first data 220*a* and the second data 220*b* as abnormal data in response to detection of high level of the clock determining signal 'clk_fail' received from the PLL 216.

It is also contemplated that the mode determining part 230 may determine the first data 220*a* and the second data 220*b* as abnormal data if an interval occurred between the first data enable signal 'DE1' and the second data enable signal 'DE2' is determined to be out of a preset range. For example, the mode determining part 230 may determine the first data 220*a* and second data 220*b* as abnormal data if a skew occurred between the first data 220*a* and the second 220*b* that can be determined equal to or more than the line buffer memory assigned in the skew compensation part 214.

It is further contemplated that the mode determining part 230 can determine the first data 220*a* and the second data 220*b* as abnormal data if each of pulse periods of the first data enable signal and second data enable signal are determined out of a preset range. For example, the mode determining part 230 can determine the first data 220*a* and the second data 220*b* as abnormal data if the pulse period corresponding to each of line data in the first data enable signal 'DE1' and second data enable signal 'DE2' is determined out of the preset range or the pulse period corresponding to the data of a single frame is determined out of the preset range.

Figure 3:
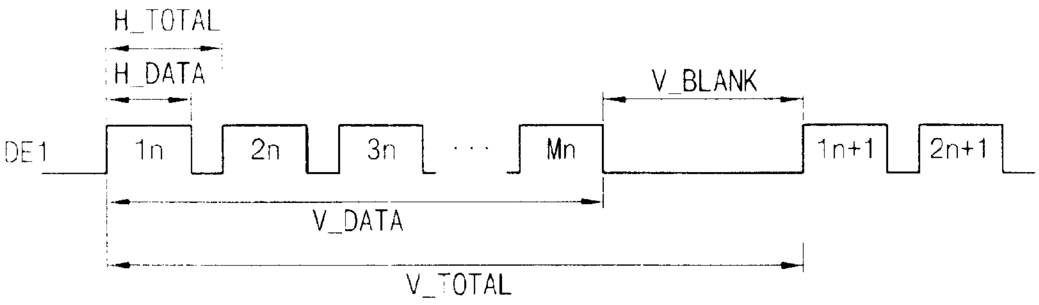
FIG. 3 is a diagram of a wave form illustrating an exemplary operation of a mode determining part of FIG. 2.

FIG. 3 is a wave form diagram illustrating an exemplary operation of a mode determining part of FIG. 2.

Referring to FIG. 3, the mode determining part 230 can be provided to determine the first data 220*a* and the second data 220*b* as abnormal data if the number of the pulse periods corresponding to a horizontal data H_DATA of one line in the first data enable signal 'DE1' is determined out of the preset range. For example, the mode determining part 230 can determine is the first data 220*a* and the second data 220*b* as abnormal data if a number of the pulse periods are determined less than a minimum value or more than a maximum value based on set of threshold value ranges. In addition, the mode determining part 230 can determine the first data 220*a* and the second data 220*b* as abnormal data if a number of the pulse periods 'H_TOTAL' which can be a sum of the pulse periods corresponding to the horizontal data 'H_DATA' of one line in the first data enable signal 'DE1' and corresponding to a horizontal blank period 'H_BLANK' in the first data enable signal 'DE1' that can be determined out of the threshold value ranges.

The mode determining part 230 can be provided to determine the first data 220*a* and the second data 220*b* as abnormal data if a number of pulse periods corresponding to vertical data 'V_DATA' of a single frame is determined out of the threshold value ranges or the number of pulse periods 'V_TOTAL' which can be a sum of the pulse periods corresponding to the vertical data 'V_DATA' of the single frame and preset vertical blank periods 'V_BLANK' that are determined out of the threshold value ranges.

The mode determining part 230 can generate a low level mode determining signal 'Fail_gen' in response to detection of the first data 220*a* and the second data 220*b* that are determined normal data. The mode determining part 230 can generate a high level mode determining signal 'Fail_gen' in response to detection of the first data 220*a* and the second data 220*b* that are determined abnormal data. In some examples, the mode determining signal 'Fail_gen' can be outputted to the signal generating part 240, the first selection part 250, the second selection par 260, and the overdriving part 280.

The signal generating part 240 can be provided to generate a data enable signal for an abnormal mode 'Fail_DE' and a test pattern 'Tp' in response to determining a high level is signal 'Fail_gen.' The data enable signal for the abnormal mode 'Fail_DE' can be transmitted to the first selection part 250, and the test pattern 'Tp' can be transmitted to the second selection part 260.

The first selection part 250 can be configured to selectively output one of the data enable signal for the abnormal mode 'Fail_DE' and a data enable signal for a normal mode 'Nor_DE' depending on the mode determining signal 'Fail_gen' received from the mode determining part 230. In this example, the data enable signal for the normal mode 'Nor_DE' may be the first data enable signal 'DE1' or the second data enable signal 'DE2.' The first selection part 250 can output the data enable signal for the abnormal mode 'Fail_DE' in response to receipt of a high level signal 'Fail_gen'. The first selection part 250 can output the data enable signal for the normal mode 'Nor_DE' in response to receipt of a low level signal 'Fail_gen'.

The second selection part 260 can be configured to select one of an N-th frame data 'Fn' outputted from the serializing part 220 and the test pattern 'Tp' outputted from the signal generating part 240 depending on the mode determining signal 'Fail_gen' received from the mode determining part 230. For example, the second selection part 260 can select the N-th frame data 'Fn' in response to receipt of a low level signal 'Fail_gen'. The second selection part 260 can select the test pattern 'Tp' in response to receipt of high level signal 'Fail_gen'.

For compensating a color characteristic (or gamma characteristic), the color compensation part 270 can be provided to compensate a selection frame data 'Fn' or 'Tp' selected in the second selection part 260 to generate a color compensation frame data 'CFn' by using a color compensation data.

The overdriving part 280 can be provided to receive the color compensation frame is data 'CFn.' The overdriving part 280 can select one of the color compensation frame data 'CFn' and the previous frame data 'Fn−1' depending on the mode determining signal 'Fail_gen.' The previous frame data 'Fn−1' can be stored in a frame memory. The overdriving part 280 can compensate a selected frame data to generate a compensation frame data 'Fn.'

Figure 4:
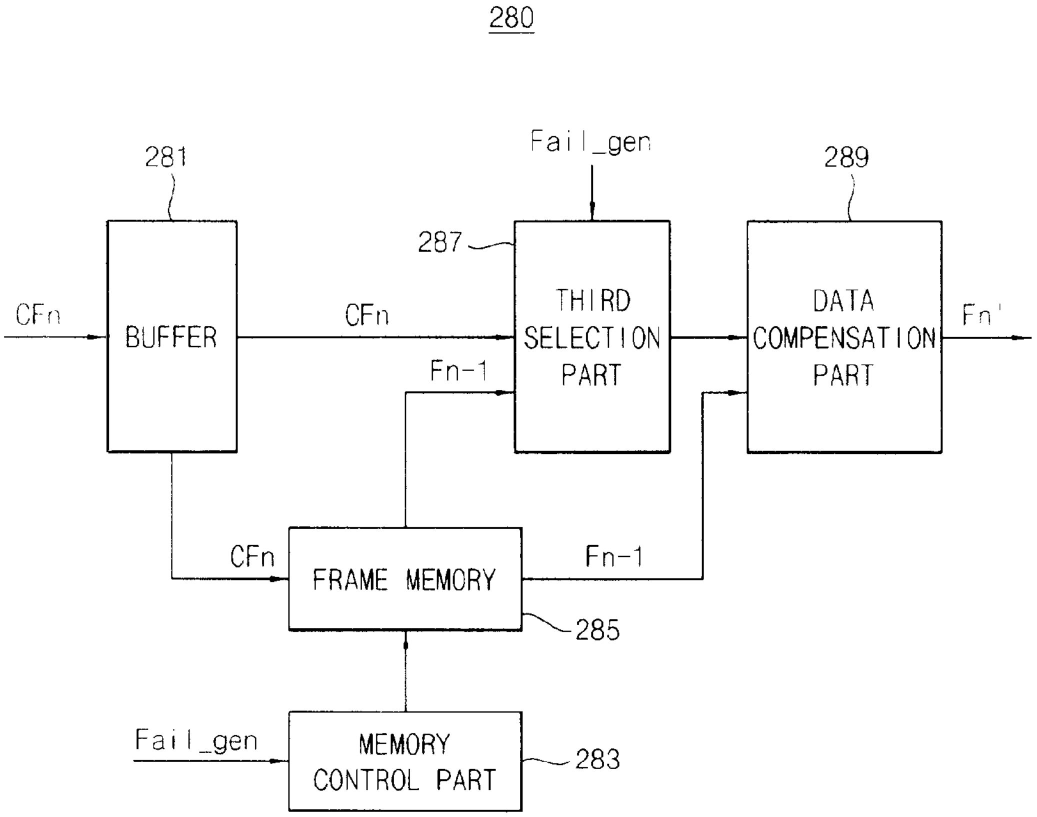
FIG. 4 is a diagram illustrating an operation of the overdriving part of FIG. 2.

FIG. 4 is a diagram illustrating an exemplary operation of the overdriving part of FIG. 2.

Referring to FIG. 2 and FIG. 4, the overdriving part 280, for example, may include a buffer 281, a memory control part 283, a frame memory 285, a third selection part 287 and a data compensation part 289.

The buffer 281 can temporarily store a color compensation frame data 'CFn' outputted from the color compensation part 270. The color compensation frame data 'CFn' stored in the buffer 281 can be transmitted to the frame memory 285 and the third selection part 287.

The memory control part 283 can be configured to generate a reading control signal and a writing control signal based on a data enable signal selected by the first selection part 250. The reading control signal and the writing control signal can control operations of reading and writing in the frame memory 285. In addition, the memory control part 283 can generate a writing prevention signal to restrict the operation of writing in the frame memory 285 in response to a high level mode determining signal 'Fail_gen.'

The frame memory 285 can be configured to perform an operation of writing the color compensation frame data 'CFn' and an operation of reading the previous frame data 'Fn−1' stored depending on the reading control signal and the writing control signal received from the memory control part 283. An operation of writing the color compensation frame data 'CFn' in is the frame memory can be restricted in response to receipt of the writing prevention signal is received from the memory control part 283. Thus, if the previous frame data Fn−1 stored in the frame memory 285 is received prior to receiving the N-th frame data 'Fn,' the receipt can be detected without errors.

The third selection part 287 can be provided to receive the color compensation frame data 'CFn' outputted from the buffer 281 and the previous frame data 'Fn−1' outputted from the frame memory 285. The third selection part 287 can select one of the color compensation frame data 'CFn' and the previous frame data 'Fn−1' depending on the mode determining signal 'Fail_gen.' For example, the third selection part 287 can select the color compensation frame data 'CFn' in response to receipt of a low level signal 'Fail_gen.' The third selection part 287 can select the previous frame data 'Fn−1' in response to receipt of a high level signal 'Fail_gen.'

The data compensation part 289 can be provided to generate the compensation frame data 'Fn' based on a selection of frame data 'CFn' or 'Fn−1' selected by the third selection part 287 and the previous frame data 'Fn−1' outputted from the frame memory 285. For example, when a grayscale is determined as a different value between the selected frame data and the previous frame data 'Fn−1,' the data compensation part 289 can compensate the selected frame data using compensation data to compensate a response speed of a liquid crystal. However, when the grayscale is determined as substantially the same value between the selection frame data and the previous frame data 'Fn−1,' the data compensation part 289 may not compensate. The compensation frame data 'Fn' can become the previous frame data 'Fn−1' if the selection frame data is determined as the previous frame data 'Fn−1.'

The interface part 290 can be provided to divide the compensation frame data 'Fn' into first compensation data 300*a* and second compensation data 300*b*, and to transmit the first compensation data 300*a* and the second compensation data 300*b* to the first driving circuit 310 and the second data driving circuit 330, respectively.

Figure 5:
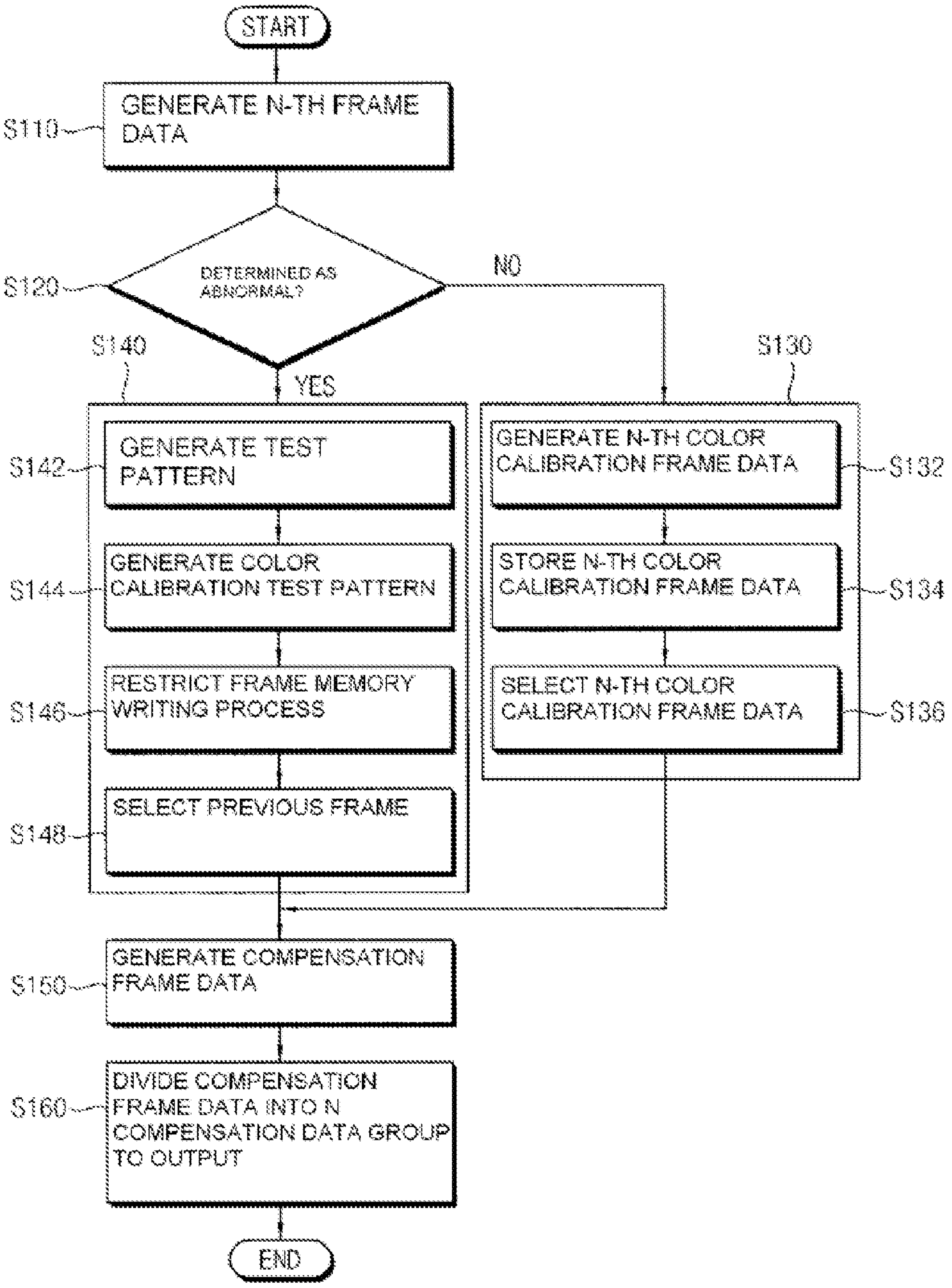
FIG. 5 is a flow chart of a process for an operation of driving the timing control part of FIG. 2.

FIG. 5 is a flow chart of a process for an exemplary operation of driving the timing control part of FIG. 2.

Referring to FIG. 2, FIG. 4 and FIG. 5, the serializing part 220, as in step S110, can perform serialization by converting the first data 220*a* and second data 220*b* received from the LVDS receiving part 210 during the N-th frame to generate the N-th frame data Fn, per step S110.

The mode determining part 230 can be configured to determine, in step S120, whether the first data 220*a* and the second data 220*b* are determined normal using the first data enable signal 'DE1' second data enable signal 'DE2' and the clock determining signal 'clk_fail' received from the LVDS receiving part 210.

The mode determining part 230 can output the low level mode determining signal 'Fail_gen' in response to receipt of the first data 220*a* and the second data 220*b* as normal. The mode determining part 230 can output the high level mode determining signal 'Fail_gen' in response to receipt of the first data 220*a* and second data 220*b* as abnormal.

The N-th frame data 'Fn' can be selected if the first data 220*a*, and the second data 220*b* are determined as normal, per step S130. As in step S140, the previous frame data 'Fn−1' can be selected if the first data 220*a* and the second data 220*b* are determined as abnormal.

For example, an operation for a determination whether the first data 220*a* and the second data 220*b* are normal is further detailed below with respect to following steps in FIG. 5.

The first selection part 250 can select the data enable signal for the normal mode 'Nor_DE' in response to the low level mode determining signal 'Fail_gen.' The second selection part 260 can select the N-th frame data 'Fn' outputted from the serializing part 220 in response to the low level mode determining signal 'Fail_gen.'

As in step S132, the color compensation part 270 can compensate the N-th frame data 'Fn' using the color compensation data to generate an N-th color compensation frame data 'CFn.'

The memory control part 283 can control the frame memory 285 to perform an operation of writing the N-th color compensation frame data 'CFn' and an operation of reading the previous frame data 'Fn−1.' The frame memory 285 can read out the previous frame data 'Fn−1' controlled by the memory control part 283 to output the previous frame data 'Fn−1' to the third selection part 287 and the data compensation part 289, and can store the N-th color compensation frame data 'CFn' inputted from the buffer 281, per step S134.

The third selection part 287, per step S136, can select the N-th color compensation frame data 'CFn' in response to the low level mode determining signal 'Fail_gen.'

An operation, if the first and second data 220*a* and 220*b* are determined as abnormal, is further detailed below with respect to following steps of FIG. 5.

In step S142, the signal generating part 240 can generate the test pattern 'Tp' in response to receipt of the high level mode determining signal 'Fail_gen.'

The first selection part 250 can select the data enable signal for an abnormal mode 'Fail_DE' in response to receipt of the high level mode determining signal 'Fail_gen.' The second selection part 260 can select the test pattern 'Tp' outputted from the signal generating part 240 in response to receipt of the high level mode determining signal 'Fail_gen.'

The color compensation part 270 can compensate, in step S144, the test pattern 'Tp' using the color compensation data to generate a color compensation test pattern.

The memory control part 283 can generate the reading control signal for performing an operation of reading the previous frame data 'Fn−1' and can generate the writing prevention signal for restricting an operation of writing the color compensation test pattern.

An operation of writing the color compensation test pattern in the frame memory 285 can be restricted according to the writing prevention signal, per step S146. The frame memory 285 can read out the previous frame data 'Fn−1' according to the reading control signal to output to the third selection part 287.

The third selection part 287, in step S148, can select the previous frame data 'Fn−1' in response to detection of the high level mode determining signal 'Fail_gen.'

In step S150, the data compensation part 289 can compensate a selection frame data 'CFn' or 'Fn−1' selected per step S136 or per step S148 to generate the compensation frame data 'Fn.' If the selection frame data and the previous frame data 'Fn−1' are determined substantially the same with each other, the data compensation part 289 may not compensate. However, if the selection frame data and the previous frame data 'Fn−1' are determined to different from each other, the data compensation part 289 may compensate the selection frame data using the compensation data.

In step S160, the interface part 290 can divide the compensation frame data 'Fn' into the first compensation data 300*a* and second compensation data 300*b* which can be transmitted to the first driving circuit 310 and second data driving circuit 330.

In some examples, the previous frame data 'Fn−1' stored in the frame memory 285 can be outputted if the first data 220*a* and second data 220*b* received during the N-th frame is are determined as abnormal. In this approach, a rapid screen change due to an abnormal image or a specific pattern of an image between the normal images may be prevented.

Figure 6:
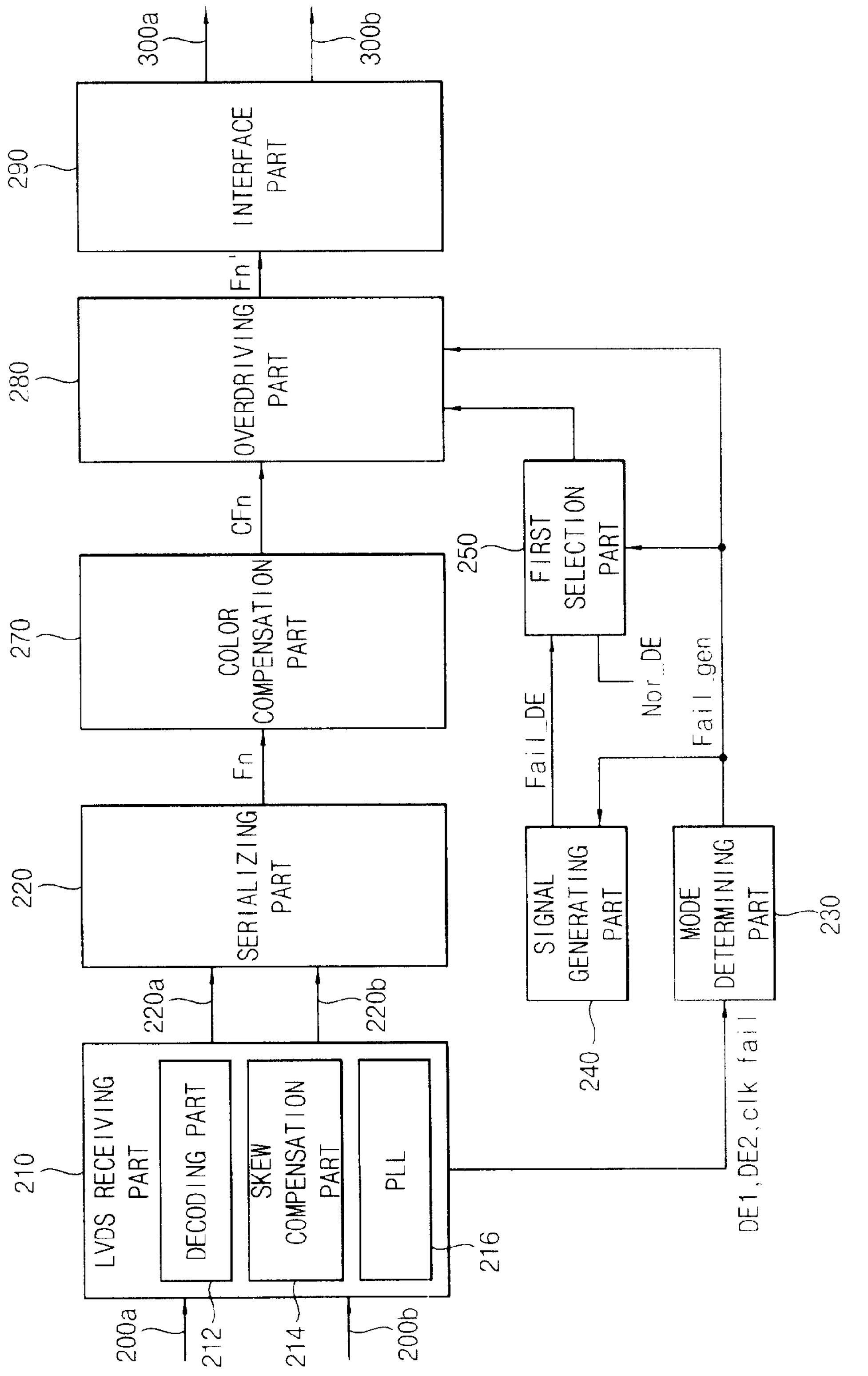
FIG. 6 is a diagram capable of supporting a timing control according to exemplary embodiments of the present invention.

FIG. 6 is a diagram capable of supporting a timing control part according to exemplary embodiments of the present invention.

A timing control part 400 of FIG. 6 can represent substantially the same function as the timing control part 200 of FIG. 2 except that the second selection part 260 between the serializing part 220 and the color compensation part 270 and redundant parts can be omitted to avoid unnecessarily obscuring the present invention. Therefore, the same reference numerals can be used to refer to the same or like parts as those described in the present exemplary embodiments, and any repetitive explanation concerning the above elements can be omitted or briefly described to avoid unnecessarily obscuring the present invention.

Referring to FIG. 1, FIG. 4 and FIG. 6, the timing control part 400, for example, may include an LVDS receiving part 210, a serializing part 220, a mode determining part 230, a signal generating part 240, a first selection part 250, a color compensation part 270, an overdriving part 280 and an interface part 290.

The mode determining part 230 can determine whether the first data 220*a* and the second data 220*b* received during an N-th frame are normal, using first data enable signal 'DE1,' second data enable signal 'DE2' and a clock determining signal 'clk_fail' received from the LVDS receiving part 210. The mode determining part 230 can generate a low level mode determining signal 'Fail_gen' if the first data 220*a* and the second data 220*b* are determined as normal. The mode determining part 230 can generate a high level mode determining signal 'Fail_gen' if the first data 220*a* and second data 220*b* are determined as abnormal.

The signal generating part 240 can generate a data enable signal for an abnormal is mode 'Fail_DE' which can be transmitted to the first selection part 250 in response to the high level mode determining signal 'Fail_gen.'

The first selection part 250 can select the data enable signal for an abnormal mode 'Fail_DE' and can output the data enable signal for the abnormal mode 'Fail_DE' to the overdriving part 280 in response to the high level mode determining signal 'Fail_gen.'

The color compensation part 270 can compensate a color of an N-th frame data 'Fn' serialized by the serializing part 220 to output an N-th color compensation frame data 'CFn' using a color compensation data.

Referring to FIG. 4, the overdriving part 280 may include a buffer 281, a memory control part 283, a frame memory 285, a third selection part 287 and a data compensation part 289.

The third selection part 287 can select the N-th color compensation frame data 'CFn' outputted from the buffer 281 if the low level mode determining signal 'Fail_gen' is received from the mode determining part 230. The third selection part 287 can select the previous frame data 'Fn−1' outputted from the frame memory 285 if the high level mode determining signal 'Fail_gen' is received.

The data compensation part 289 can compare a frame data selected in the third selection part 'CFn' or 'Fn−1' and the previous frame data 'Fn−1.' If the selected frame data and the previous frame data 'Fn−1' are determined as substantially the same with each other, the data compensation part 289 may not compensate. If the selected frame data and the previous frame data 'Fn−1' are determined as different from each other, the data compensation part 289 may compensate the selected frame data 'CFn' or 'Fn−1' to generate a compensation frame data 'Fn.'

The interface part 290 can divide the compensation frame data 'Fn' into the first is compensation data 300*a* and the second compensation data 300*b* which can be transmitted to the first and second data driving circuits 310 and 330.

Figure 7:
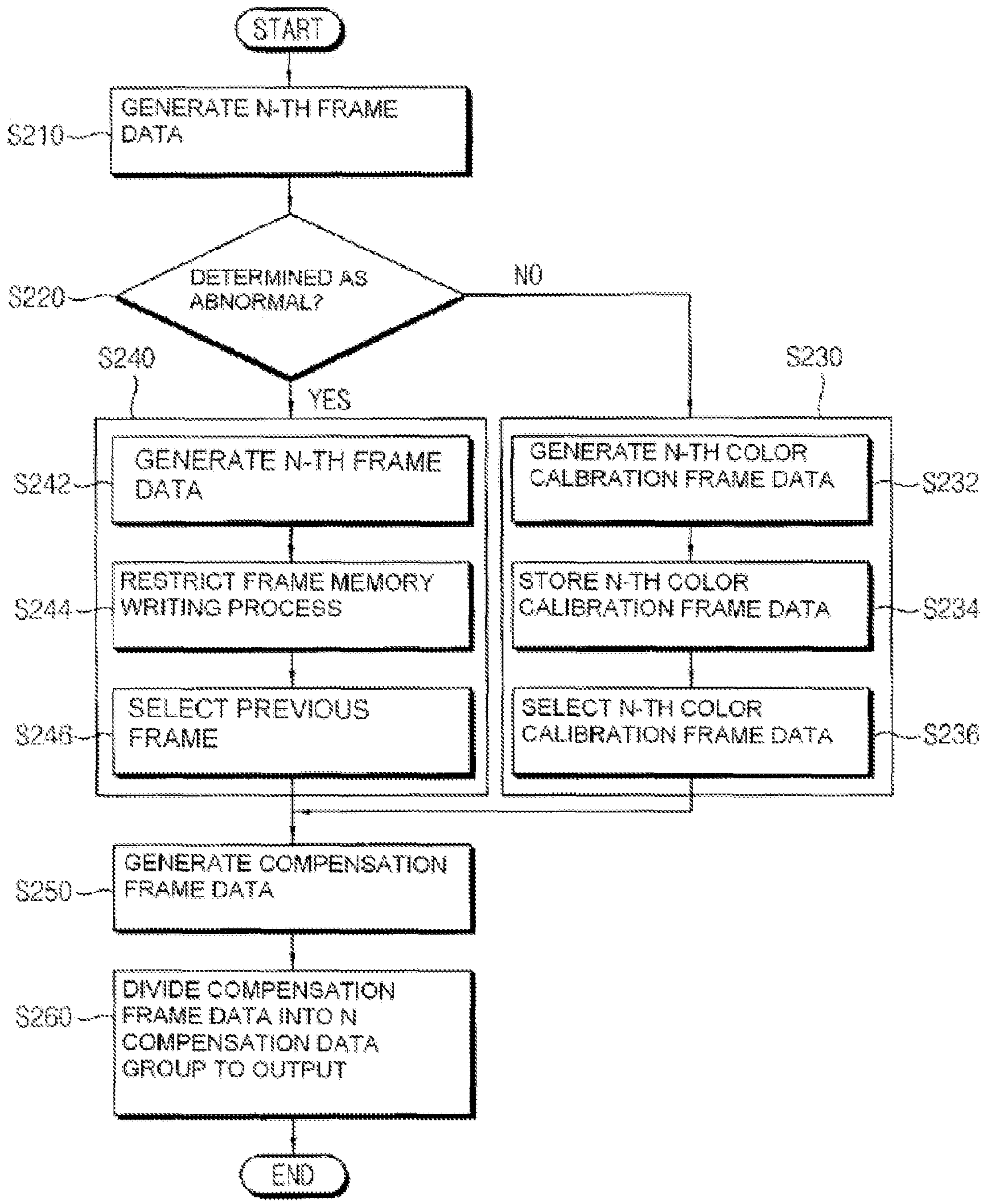
FIG. 7 is a flow chart of a process for an operation of driving the timing control part of FIG. 6.

FIG. 7 is a flow chart of a process for an exemplary operation of driving the timing control part of FIG. 6.

Referring to FIG. 4, FIG. 6 and FIG. 7, the serializing part 220 can perform serialization by converting data structure of the first data 220*a* and the second data 220*b* received from the LVDS receiving part 210 during the N-th frame to generate the N-th frame data Fn, per step S210 of FIG. 7.

The mode determining part 230 can determine whether the first data 220*a* and second data 220*b* are normal using the first data enable signal 'DE1,' second data enable signal 'DE2' and the clock determining signal 'clk_fail' received from the LVDS receiving part 210, per step S220. The mode determining part 230 can output a low level mode determining signal 'Fail_gen', if the first and second data 220*a* and 220*b* are determined as normal. The mode determining part 230 can output a mode determining signal 'Fail_gen' of a high level if the first data 220*a* and second data 220*b* are determined as abnormal.

As in step S230, the N-th color compensation frame data 'CFn' is selected if the first data 220*a* and second data 220*b* are determined as normal. The previous frame data 'Fn−1' is selected if the first data 220*a* and second data 220*b* are determined as abnormal, per step S240.

An operation of selecting the N-th color compensation frame data 'CFn' is further detailed below with respect to following steps of FIG. 6 and FIG. 7.

The first selection part 250 can select the data enable signal for a normal mode 'Nor_DE' and can output the data enable signal for the normal mode 'Nor_DE' to the memory control part 283 in response to receipt of the low level mode determining signal 'Fail_gen.'

The color compensation part 270, in step S232, can compensate the N-th frame data 'Fn' using the color compensation data to generate an N-th color compensation frame data 'CFn.'

The memory control part 283 can control the frame memory 285 to perform an operation of writing the N-th color compensation frame data 'CFn' and an operation of reading the previous frame data 'Fn−1.' The frame memory 285 can read out the previous frame data 'Fn−1' by controlling the memory control part 283 to output the previous frame data 'Fn−1' to the third selection part 287 and the data compensation part 289, and can store the N-th color compensation frame data 'CFn' inputted from the buffer 281, per step S234.

The third selection part 287, in step S236, can select the N-th color compensation frame data 'CFn' in response to receipt of the low level mode determining signal 'Fail_gen.'

A process of selecting the previous frame data Fn−1 is further detailed below with respect to following steps of FIG. 6 and FIG. 7.

The signal generating part 240 can generate a data enable signal for an abnormal mode 'Fail_DE' in response to the high level mode determining signal 'Fail_gen.' The first selection part 250 can select the data enable signal for an abnormal mode 'Fail_DE' which can be outputted to the memory control part 283 in response to receipt of the high level mode determining signal 'Fail_gen.'

The color compensation part 270 can compensate the N-th frame data 'Fn' using the color compensation data to generate an N-th color compensation frame data 'CFn,' per step S242.

The memory control part 283 can generate the reading control signal for performing an operation of reading of the previous frame data 'Fn−1' and the writing prevention is signal for restricting an operation of writing the N-th color compensation frame data 'CFn.'

The frame memory 285 can restrict the operation of writing the N-th color compensation frame data 'CFn' according to the writing prevention signal, per step S244. The frame memory 285 can read out the previous frame data 'Fn−1' according to the reading control signal to output the previous frame data 'Fn−1' to the third selection part 287.

The third selection part 287, in step S246, can select the previous frame data 'Fn−1' in response to the mode determining signal 'Fail_gen' of a high level.

The data compensation part 289 can compensate a frame data 'Fn' or 'Fn−1' selected in step S236 or in step S246 to generate a compensation frame data 'Fn,' per step S250.

In step S260, the interface part 290 can divide the compensation frame data 'Fn' into the first compensation data 300*a* and second compensation data 300*b* and can transmit the first compensation data 300*a* and second compensation data 300*b* to the first driving circuit 310 and second data driving circuit 330.

According to the present invention, when an abnormal frame data is inputted, a previous frame data stored can be displayed to prevent a screen flicker occurred due to a rapid screen change causing an abnormal image or displaying a specific pattern of an image between normal images. Thus, display quality may be enhanced.

One of ordinary skill in the art would recognize that the processes for processing data may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 8.

Figure 8:
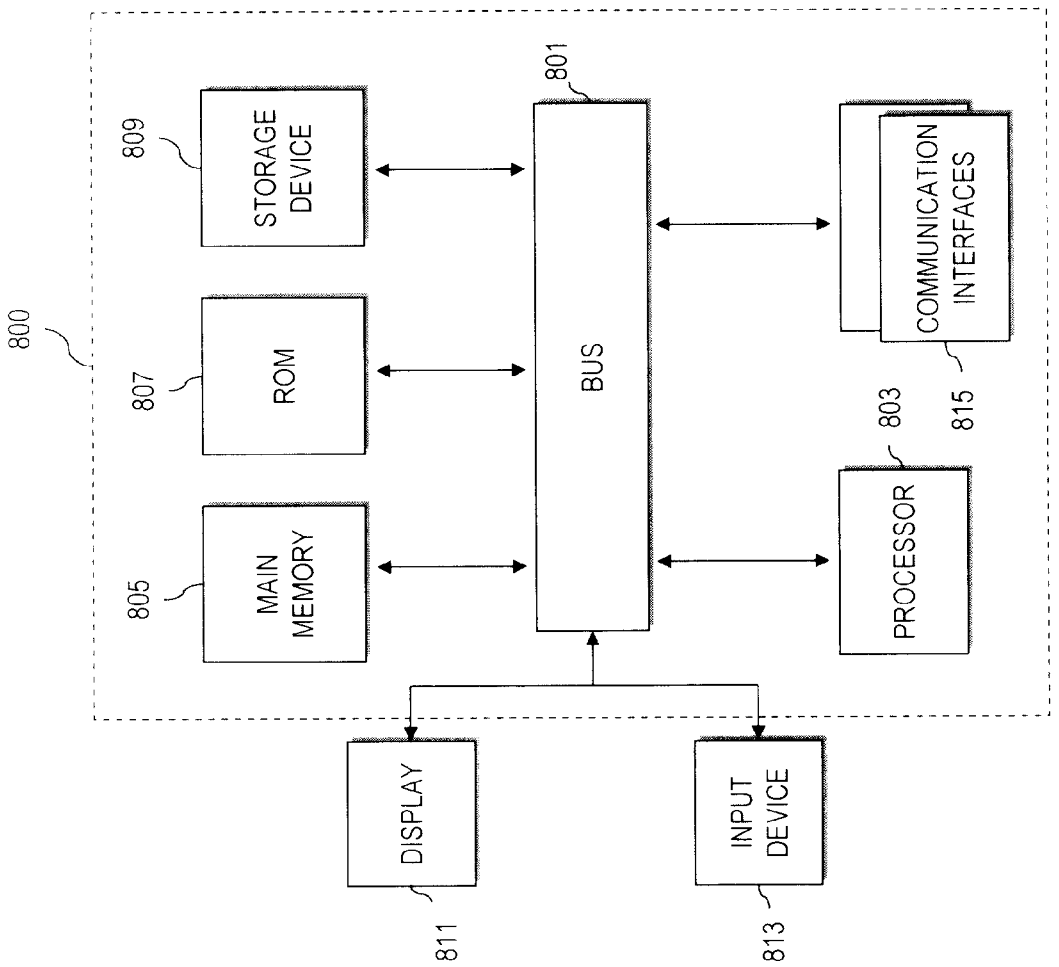
FIG. 8 is a diagram of hardware that can be used to implement exemplary embodiments of the present invention.

FIG. 8 illustrates exemplary hardware upon which various embodiments of the is invention can be implemented. A computing system 800 includes a bus 801 or other communication mechanism for communicating information and a processor 803 coupled to the bus 801 for processing information. The computing system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computing system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computing system 800 may be coupled with the bus 801 to a display 811, such as a liquid crystal display, or active matrix display, for displaying information to a user. An input device 813, such as a keyboard including alphanumeric and other keys, may be coupled to the bus 801 for communicating information and command selections to the processor 803. The input device 813 can include a cursor control, such as a mouse, a trackball, or cursor direction keys, for communicating direction information and command selections to the processor 803 and for controlling cursor movement on the display 811.

According to various embodiments of the invention, the processes described herein can be provided by the computing system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the is processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 800 also includes at least one communication interface 815 coupled to bus 801. The communication interface 815 provides a two-way data communication coupling to a network link (not shown). The communication interface 815 sends and receives electrical, electromagnetic, or optical signals that carry digital data streams representing various types of information. Further, the communication interface 815 can include peripheral interface devices, such as a Universal Serial Bus (USB) interface, a PCMCIA (Personal Computer Memory Card International Association) interface, etc.

The processor 803 may execute the transmitted code while being received and/or store the code in the storage device 809, or other non-volatile storage for later execution. In this manner, the computing system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of driving a display, the method comprising:
 receiving image data in sets of parallel signals;
 detecting abnormality based on evaluation of the sets of parallel signals;
 serializing the sets of parallel signals of image data received to generate a present frame of image data;
 selecting between the present frame of image data and a previous frame of image data depending on the abnormality detection;
 compensating the selected frame of image data to generate a compensation frame data; and
 dividing the compensation frame data into N compensation data,
 wherein N is a natural number.

2. The method of claim 1, wherein the evaluation is performed using a synchronized signal corresponding to the received image data.

3. The method of claim 1, wherein the evaluation is performed using synchronized signals comprising a clock signal and N data enable signals corresponding to the received image data.

4. The method of claim 3, wherein abnormality is detected based on a delayed interval between the N data enable signals being detected as out of a threshold range.

5. The method of claim 3, wherein abnormality is detected based on a pulse period of the N data enable signals being detected as out of a threshold range.

6. The method of claim 3, wherein abnormality is detected based on a number of the clock signal cycles being detected as out of a threshold range.

7. The method of claim 2, further comprising:
 selecting the previous frame of image data in response to detecting abnormality, otherwise selecting the present frame of image data.

8. The method of claim 7, wherein an operation of writing the present frame of image data in a frame memory is restricted based on generating a writing prevention signal based on detecting abnormality.

9. A display apparatus comprising:
 an input unit to receive image data in sets of parallel structure;
 an evaluation unit to determine abnormality based on evaluating the sets of parallel structure;
 a control part to convert the sets of parallel structure of image data received into a serialization structure to generate a present frame of image data;
 an overdriving part to select between the present frame of image data and a previous frame of image data, wherein the selection is based on the abnormality determination, wherein the selected frame of image data is compensated to form compensation frame data;
 an interface part to divide the compensated frame data into N compensation data and to output the N compensation data; and
 a data driving part to generate a data driving voltage corresponding to the N compensation data to output the data driving voltage to the respective N display areas,
 wherein N is a natural number.

10. The display apparatus of claim 9, wherein the evaluation unit is configured to use a synchronized signal corresponding to the received data and is configured to output a logically positive mode determining signal in response to determining abnormality.

11. The display apparatus of claim 9, wherein the evaluation unit is configured to use synchronized signals comprising a clock signal and N data enable signals corresponding to the received image data.

12. The display apparatus of claim 11, wherein the evaluation unit is configured to determine abnormality based on an interval occurring between the N data enable signals being determined to be out of a threshold range.

13. The display apparatus of claim 11, wherein the evaluation unit is configured to determine abnormality based on a pulse period of the N data enable signals being determined to be out of a threshold range.

14. The display apparatus of claim 11, wherein the evaluation unit is configured to determine abnormality based on a number of the clock signal cycles being determined to be out of a threshold range.

15. The display apparatus of claim 10, wherein the overdriving part further comprises:
 a frame memory to store the previous frame of image data;
 a selection part to select the previous frame of image data in response to the logically positive mode determining signal; and
 a data compensation part to compare the selected frame of image data with the previous frame of image data to generate the compensation frame data.

16. The display apparatus of claim 15, wherein the overdriving part further comprises a memory control part to generate a writing prevention signal to restrict an operation of writing the present frame of image data in the frame memory in response to determining abnormality.

17. The display apparatus of claim 9, wherein the input unit further comprises a timing control part, wherein the timing control part comprises a signal receiving part to decode N received image signals to output N received image data, N data enable signals, and clock signals.

18. The display apparatus of claim 17, wherein the timing control part further comprises a color compensation part to compensate the present frame of image data using previously stored color compensation data.

19. The display apparatus of claim 18, wherein the timing control part further comprises:
 a signal generating part to generate a data enable signal for an abnormal mode based on the abnormality determination; and
 a selection part to select the data enable signal for the abnormal mode in response to determining abnormality and to output the data enable signal for the abnormal mode to the overdriving part.

20. The display apparatus of claim 18, wherein the timing control part further comprises:
 a signal generating part to generate a data enable signal for an abnormal mode and a test pattern based on the abnormality determination;
 a selection part to select the data enable signal for the abnormal mode in response to determining abnormality and to output the data enable signal for the abnormal mode to the overdriving part; and a selection part to select the test pattern in response to determining abnormality and to output the test pattern to the color compensation part.

21. An apparatus for a display panel comprising:

a processor to convert image data received in sets of data in a parallel format into a frame of image data in a serialization format and to detect abnormality in the received data based on evaluating the sets of data, wherein the processor is configured to determine to select between the received frame of image data converted in the serialization format and a previous frame of image data stored previously than the received frame of image data, the determination configured to be based on a threshold reference value;

a memory to store the selected data corresponding to N sectors, each sector corresponding to the respective displaying portions of a display panel, wherein a control part is configured to generate a compensation data to compensate the selected data, and the compensated data frame is divided into N to output the compensated data to the respective N sectors of the display panel, wherein N is a natural number.

22. The apparatus of claim 21, wherein the evaluation is configured to be performed using a synchronized signal corresponding to the received image data.

23. The apparatus of claim 21, wherein the evaluation is configured to be performed using synchronized signals comprising a clock signal and N data enable signals corresponding to the received image data.

24. The apparatus of claim 21, wherein the processor is further configured to output a logically positive mode signal in response to detecting abnormality.

25. The apparatus of claim 23, wherein the processor is further configured to detect abnormality based on an interval between the N data enable signals being detected to be out of a threshold range.

26. The apparatus of claim 23, wherein the processor is further configured to detect abnormality based on a number of the clock signal cycles being detected as out of a threshold range.

27. The apparatus of claim 21, wherein the processor is further configured to generate a writing prevention signal to restrict an operation of writing a present frame of image data in a frame memory in response to detecting abnormality.

28. The apparatus of claim 21, wherein the processor is further configured to compensate the selected data using color compensation data.

* * * * *